US008115598B2

(12) United States Patent
Rofougaran et al.

(10) Patent No.: US 8,115,598 B2
(45) Date of Patent: Feb. 14, 2012

(54) NEAR FIELD COMMUNICATION FRONT-END

(75) Inventors: Ahmadreza (Reza) Rofougaran, Newport Coast, CA (US); Maryam Rofougaran, Rancho Palos Verdes, CA (US); Amin Shameli, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1001 days.

(21) Appl. No.: 12/048,786

(22) Filed: Mar. 14, 2008

(65) Prior Publication Data

US 2008/0238625 A1 Oct. 2, 2008

Related U.S. Application Data

(60) Provisional application No. 60/921,221, filed on Mar. 30, 2007, provisional application No. 60/932,411, filed on May 31, 2007.

(51) Int. Cl.
| | |
|---|---|
| H04B 5/22 | (2006.01) |
| H04B 1/38 | (2006.01) |
| H04B 1/40 | (2006.01) |
| H04B 7/00 | (2006.01) |
| H04B 1/66 | (2006.01) |
| H04B 7/02 | (2006.01) |
| H04Q 5/22 | (2006.01) |
| H04M 1/00 | (2006.01) |
| H04L 5/16 | (2006.01) |
| G08B 13/14 | (2006.01) |
| G08B 26/00 | (2006.01) |
| G05B 19/00 | (2006.01) |

(52) U.S. Cl. ............ 340/10.1; 340/10.3; 340/572.4; 340/5.61; 340/505; 340/568.1; 455/73; 455/556.1; 455/76; 455/561; 455/70; 455/102; 455/101

(58) Field of Classification Search ........... 340/572.1, 340/572.4, 572.7, 572.8, 573.1, 573.2, 568.1, 340/500, 505, 10.1, 825.54, 825.49; 455/63.1, 455/263, 212, 265, 208, 132, 195.1, 260, 455/70, 67.14, 67.15, 168.1, 334, 101, 102; 375/267, 326, 344, 347, 350, 323
See application file for complete search history.

(56) References Cited

U.S. PATENT DOCUMENTS

| | | | | |
|---|---|---|---|---|
| 6,661,335 | B1 * | 12/2003 | Seal | 340/10.1 |
| 7,092,674 | B2 * | 8/2006 | Pan | 455/73 |
| 7,224,722 | B2 * | 5/2007 | Shi et al. | 375/219 |
| 2005/0254596 | A1 * | 11/2005 | Naguib | 375/299 |
| 2006/0035595 | A1 * | 2/2006 | Shi | 455/73 |
| 2006/0043177 | A1 * | 3/2006 | Nycz et al. | 235/385 |
| 2007/0027943 | A1 * | 2/2007 | Jensen et al. | 708/300 |
| 2007/0058703 | A1 * | 3/2007 | Behzad et al. | 375/219 |
| 2007/0285246 | A1 * | 12/2007 | Koyama | 340/572.1 |
| 2008/0024278 | A1 * | 1/2008 | Volpi et al. | 340/10.1 |

* cited by examiner

*Primary Examiner* — Brian Zimmerman
*Assistant Examiner* — Mirza Alam
(74) *Attorney, Agent, or Firm* — Garlick Harrison & Markison; Timothy W. Markison; Jessica W. Smith

(57) ABSTRACT

A near field communication front-end includes an up conversion module, a plurality of coils, and a down conversion module. The up conversion module is coupled to convert an outbound symbol stream into a plurality of outbound signals based on a frequency-space encoding scheme. The plurality of coils is coupled to electromagnetically transmit the plurality of outbound signals and to electromagnetically receive a plurality of inbound signals in accordance with the frequency-space encoding scheme. The down conversion module is coupled to convert the plurality of inbound signals into an inbound symbol stream in accordance with the frequency-space encoding scheme.

22 Claims, 13 Drawing Sheets

NEAR FIELD COMMUNICATION FRONT-END

This patent application is claiming priority under 35 USC §119 to a provisionally filed patent application entitled RFID SYSTEM, having a provisional filing date of Mar. 30, 2007, and a provisional Ser. No. 60/921,221; and to a provisionally filed patent application entitled RFID SYSTEM, having a provisional filing date of May 31, 2007, and a provisional Ser. No. 60/932,411.

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communication systems and more particularly to RFID systems.

2. Description of Related Art

A radio frequency identification (RFID) system generally includes a reader, also known as an interrogator, and a remote tag, also known as a transponder. Each tag stores identification data for use in identifying a person, article, parcel or other object. RFID systems may use active tags that include an internal power source, such as a battery, and/or passive tags that do not contain an internal power source, but instead are remotely powered by the reader.

Communication between the reader and the remote tag is enabled by radio frequency (RF) signals. In general, to access the identification data stored on an RFID tag, the RFID reader generates a modulated RF interrogation signal designed to evoke a modulated RF response from a tag. The RF response from the tag includes the coded identification data stored in the RFID tag. The RFID reader decodes the coded identification data to identify the person, article, parcel or other object associated with the RFID tag. For passive tags, the RFID reader also generates an unmodulated, continuous wave (CW) signal to activate and power the tag during data transfer.

RFID systems typically employ either far-field technology, in which the distance between the reader and the tag is great compared to the wavelength of the carrier signal, or near-field technology, in which the operating distance is less than one wavelength of the carrier signal, to facilitate communication between the RFID reader and RFID tag. In far-field applications, the RFID reader generates and transmits an RF signal via an antenna to all tags within range of the antenna. One or more of the tags that receive the RF signal responds to the reader using a backscattering technique in which the tags modulate and reflect the received RF signal. In near-field applications, the RFID reader and tag communicate via mutual inductance between corresponding reader and tag inductors.

Currently, RFID readers are formed of separate and discrete components whose interfaces are well-defined. For example, an RFID reader may consist of a controller or microprocessor implemented on a CMOS integrated circuit and a radio implemented on one or more separate CMOS, BiCMOS or GaAs integrated circuits that are uniquely designed for optimal signal processing in a particular technology (e.g., near-field or far-field). However, the high cost of such discrete-component RFID readers has been a deterrent to widespread deployment of RFID systems. In addition, there are a number of different RFID standards, each defining a different protocol for enabling communication between the reader and the tag. Discrete RFID reader designs inhibit multi-standard capabilities in the reader.

Therefore, a need exists for a highly integrated, low-cost RFID reader. In addition, a need exists for improved near field communications for an RFID reader and other applications.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
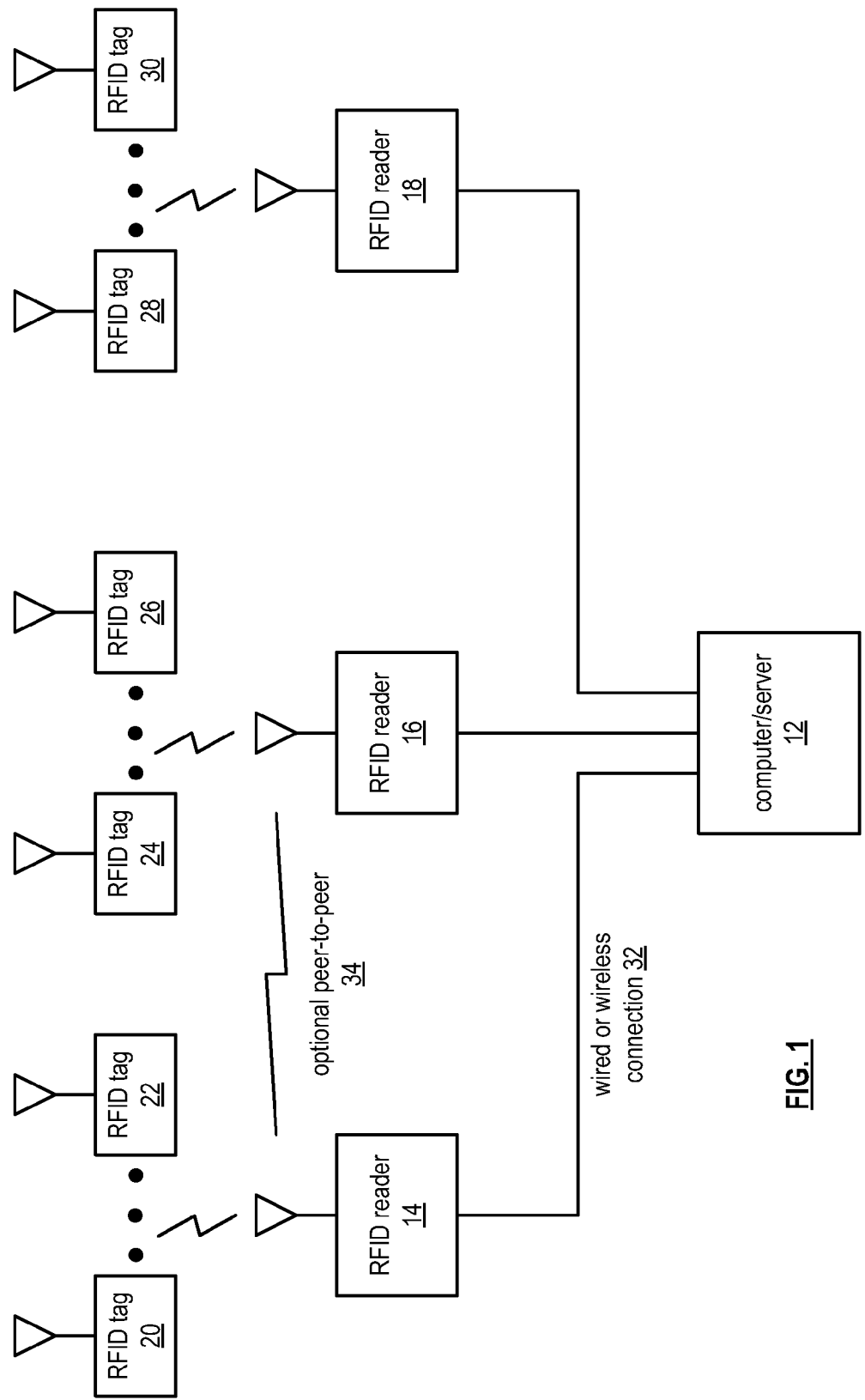
FIG. 1 is a schematic block diagram of an embodiment of an RFID system in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera. The RFID tags may be active devices that include internal power sources or passive devices that derive power from the RFID readers 14-18.

Each RFID reader 14-18 wirelessly communicates with one or more RFID tags 20-30 within its coverage area. For example, RFID tags 20 and 22 may be within the coverage area of RFID reader 14, RFID tags 24 and 26 may be within the coverage area of RFID reader 16, and RFID tags 28 and 30 may be within the coverage area of RFID reader 18. In one embodiment, the RF communication scheme between the RFID readers 14-18 and RFID tags 20-30 is a backscatter technique whereby the RFID readers 14-18 request data from the RFID tags 20-30 via an RF signal, and the RF tags 20-30 respond with the requested data by modulating and backscattering the RF signal provided by the RFID readers 14-18. In another embodiment, the RF communication scheme between the RFID readers 14-18 and RFID tags 20-30 is an inductance technique whereby the RFID readers 14-18 magnetically couple to the RFID tags 20-30 via an RF signal to access the data on the RFID tags 20-30. In either embodiment, the RFID tags 20-30 provide the requested data to the RFID readers 14-18 on the same RF carrier frequency as the RF signal.

In this manner, the RFID readers 14-18 collect data as may be requested from the computer/server 12 from each of the RFID tags 20-30 within its coverage area. The collected data is then conveyed to computer/server 12 via the wired or wireless connection 32 and/or via peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag can store the data in a non-volatile memory therein.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 to computer/server 12. In embodiments in which communications between RFID reader 16 and computer/server 12 are conveyed through the wired or wireless connection 32, the wired or wireless connection 32 may utilize any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 1 may be expanded to include a multitude of RFID readers 14-18 distributed throughout a desired location (for example, a building, office site, et cetera) where the RFID tags may be associated with equipment, inventory, personnel, et cetera. In addition, it should be noted that the computer/server 12 may be coupled to another server and/or network connection to provide wide area network coverage.

Figure 2:
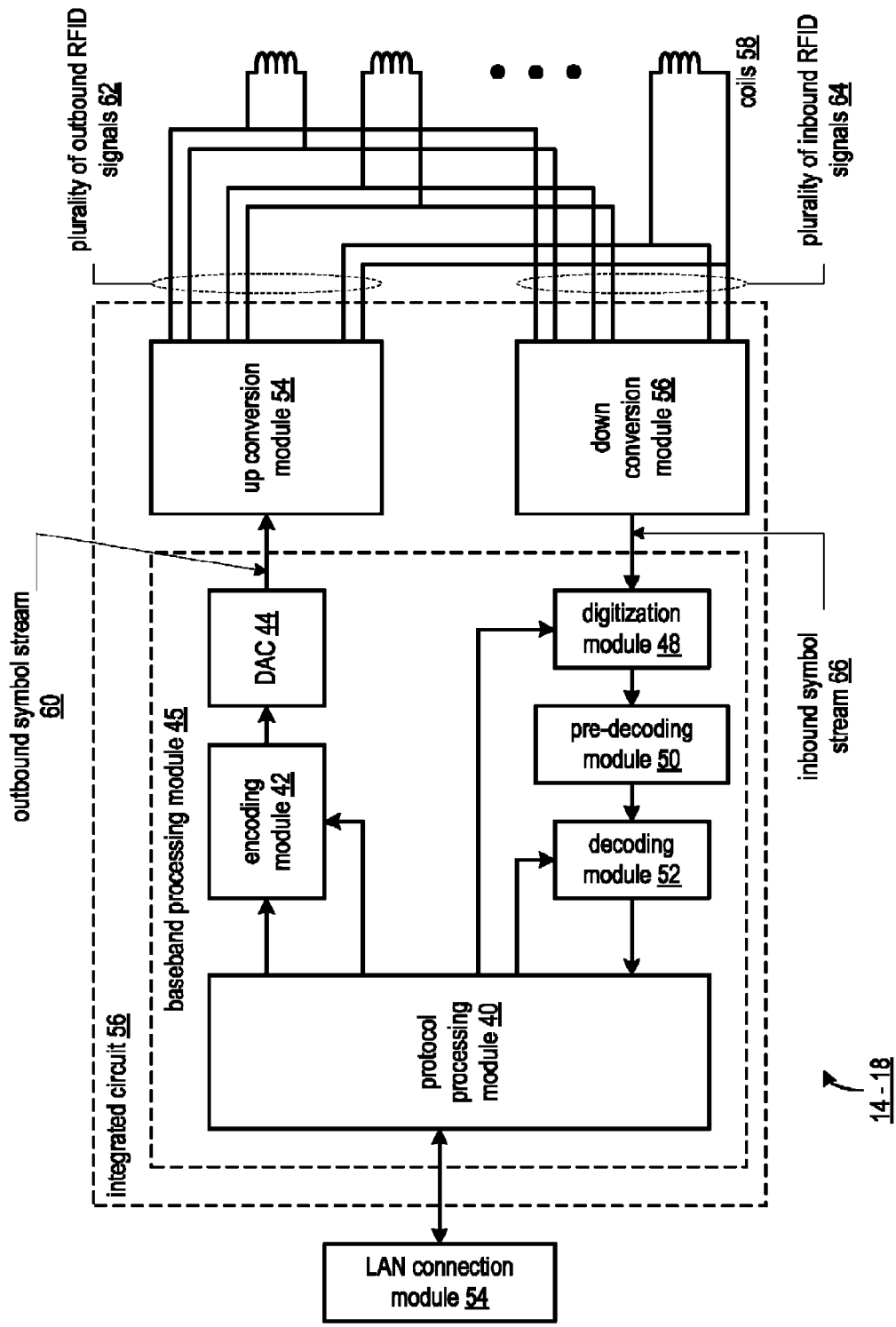
FIG. 2 is a schematic block diagram of an embodiment of an RFID reader in accordance with the present invention.

FIG. 2 is a schematic block diagram of an RFID reader 14-18 that includes an integrated circuit 56, a plurality of coils 58, and may further include a host interface module 54. The integrated circuit 56 includes a baseband processing module 45, an up conversion module 54, and a down conversion module 56. The baseband processing module 45 includes a protocol processing module 40, an encoding module 42, a digital-to-analog converter (DAC) 44, an up conversion module 45, an RF front-end 46, a down conversion module 47, a digitization module 48, a predecoding module 50 and a decoding module 52. The host interface module 54 may include a communication interface to a host device, such as a USB dongle, compact flash or PCMCIA. Note that the up conversion module 54, the down conversion module 56, and plurality of coils 58 provide a near field communication (NFC) front end that may be used in other NFC applications beyond RFID.

The baseband processing module 45 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-13.

In operation, the protocol processing module 40 is coupled to prepare data for encoding in accordance with a particular RFID standardized protocol. In an embodiment, the protocol processing module 40 is programmed with multiple RFID standardized protocols to enable the RFID reader 14-18 to communicate with RFID tags, regardless of the particular protocol associated with the tag. In this embodiment, the protocol processing module 40 operates to program filters and other components of the encoding module 42, decoding module 52, and pre-decoding module 50 in accordance with the particular RFID standardized protocol of the tag(s) currently communicating with the RFID reader 14-18.

Once the particular RFID standardized protocol has been selected, the protocol processing module 40 generates and provides outbound RFID digital data to the encoding module 42, which encodes the data in accordance with the selected RFID standardized protocol. By way of example, but not limitation, the RFID protocols may include one or more line encoding schemes, such as Manchester encoding, FM0 encoding, FM1 encoding, etc. Thereafter, the encoded data is provided to the digital-to-analog converter 44, which converts the digitally encoded data into an analog signal, which is representative of an outbound symbol stream.

The up conversion module 54 converts the outbound symbol stream 60 into a plurality of outbound RFID signals 62 based on a frequency-space encoding scheme. The up conversion module 54 provides the outbound RFID signals 62, which may have a carrier frequency within a particular frequency band (e.g., 900 MHz, 2.4 GHz, 5 GHz, 56-63 GHz, etc.), to one or more of the coils 58 in accordance with the frequency-space encoding scheme. The up conversion module 54 will be described in greater detail with reference to FIGS. 3-7 and 10-3.

One or more of the coils 58 electromagnetically transmits the outbound RFID signals 62 to a coil in an RFID tag or other NFC device. Note that the range between the tag, or other device, and the reader is limited by the transmit power of the tag. For example, if:

$$Z_{12}(\omega_0) = V_2/I_1 = \omega_0 M_{12} Q_2$$

$\Delta Z_{11}(\omega_0) \propto \omega_0^2 \cdot M_{12}^2 \cdot Q_2$ where $Z_{12}$ is the input impedance of the tag, $Z_{11}$ is the input impedance of the reader, $V_2$ is the input voltage of the tag, $V_1$ is the output voltage of the reader, $M_{12}$ is the turns ratio between the coil of the reader and the coil of the tag, and $Q_2$ is a quality factor of the reader and/or tag coil(s). Based on these assumptions, operating at a frequency of 900 MHz and a distance of approximately 5 mm between the reader and tag, the maximum transmit current of the tag is 500 mA, the minimum reader signal is −55 dBV, the tag's minimum voltage is 0.25 volts, and a blocker to signal ratio is approximately 60 dB. Note that the tag's input voltage=$I_1 * Z_{12}$; the reader's minimum RX signal=$0.5 * (I_1 * \Delta Z_{11})2$; and the blocker to signal ratio=$Z_{11}/\Delta Z_{11}$.

The one or more of the coils electromagnetically also receives inbound RFID signals 64, which are provided to the down conversion module 56. The down conversion module 56 converts the plurality of inbound RFID signals 64 into an inbound symbol stream 66 in accordance with the frequency-space encoding scheme. The down conversion module 56 will be described in greater detail with reference to FIGS. 3, and 8-13.

The digitization module 48, which may be a limiting module or an analog-to-digital converter, converts the received baseband signal into a digital signal. The predecoding module 50 converts the digital symbol stream into a biphase encoded signal in accordance with the particular RFID protocol being utilized. The biphase encoded data is provided to the decoding module 52, which recaptures data therefrom in accordance with the particular encoding scheme of the selected RFID protocol. The protocol processing module 40 processes the recovered data to identify the object(s) associated with the RFID tag(s) and/or provides the recovered data to the server and/or computer for further processing.

Figure 3:
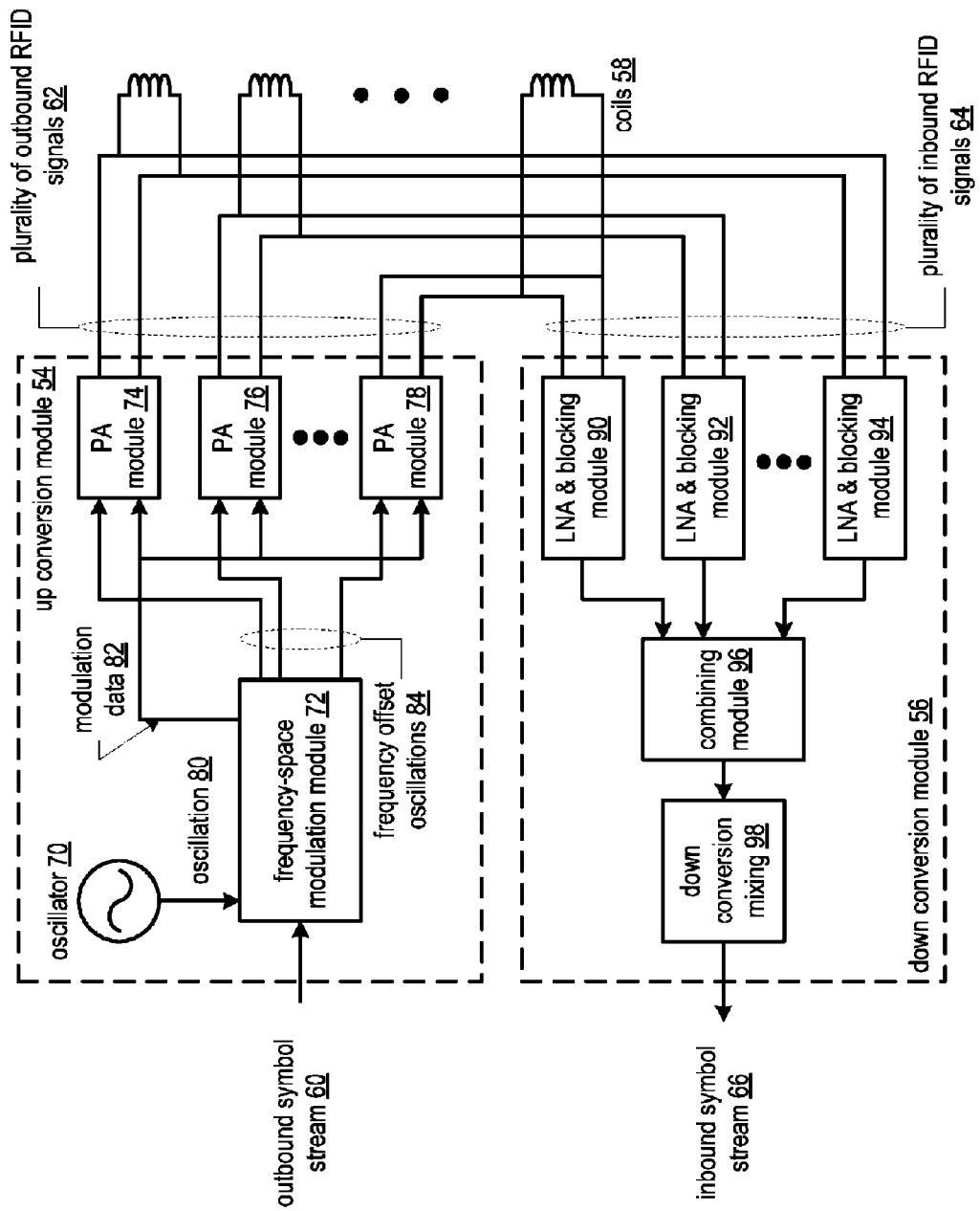
FIG. 3 is a schematic block diagram of an embodiment of up conversion and down conversion modules in accordance with the present invention.

FIG. 3 is a schematic block diagram of an embodiment of up conversion module 54 and the down conversion module 56 coupled to the coils 58. The up conversion module 54 includes an oscillator 70, a frequency-space modulation module 72, and a plurality of power amplifier modules 74-78. The down conversion module 56 includes a plurality of low noise amplifier (LNA) & blocking modules 90-94, a combining module 96 and a down conversion mixing module 98.

The oscillator 70 (which may be a phased locked loop, crystal oscillator, frequency multiplier, frequency divider, etc,) generates an oscillation 80 having a rate corresponding to a desired carrier frequency for the plurality of outbound RFID signals. The oscillation 80 may be expressed as $A_0 \cos(\omega_{RF}(t))$, where $A_0$ represents a constant amplitude and $\omega_{RF}$ is the desired carrier frequency times 2pi. As an example, the desired carrier frequency of the outbound RFID signals 62 may be in a 900 MHz frequency band, a 2.4 GHz frequency band, a 5 GHz frequency band, and/or a 60 GHz frequency band.

The frequency-space modulation module 72, an embodiment of which will be described with reference to FIG. 4, generates modulation data 82 from the outbound symbol stream 60. The frequency-space modulation module 72 also generates a plurality of frequency offset oscillations 84 from the oscillation 80 in accordance with the frequency-space encoding scheme.

The plurality of power amplifier modules 74-78 amplifies the plurality of frequency offset oscillations 84 based on the modulation data 82 to produce the plurality of outbound signals 62. A power amplifier module 74-78 may include one or more power amplifiers coupled in series and/or in parallel and/or one or more power amplifier drivers coupled in series and/or in parallel.

On the inbound side, the plurality of low noise amplifier blocking modules 90-94 (an embodiment of which will be described in greater detail with reference to FIG. 8) amplifies the plurality of inbound RFID signals 64 and to block therefrom the plurality of outbound RFID signals 62 to produce a plurality of amplified and blocked inbound RFID signals. The combining module 96, which may be one or more multipliers, one or more adders, one or more bandpass filters, etc., combines the plurality of amplified and blocked inbound RFID signals to produce a combined inbound RFID signal. The down conversion mixing module 98, which may include one or more mixers and filters, converts (e.g., mixes with the oscillation 80, filters, and/or adjusts gain) the combined inbound RFID signal into the inbound symbol stream 66.

Figure 4:
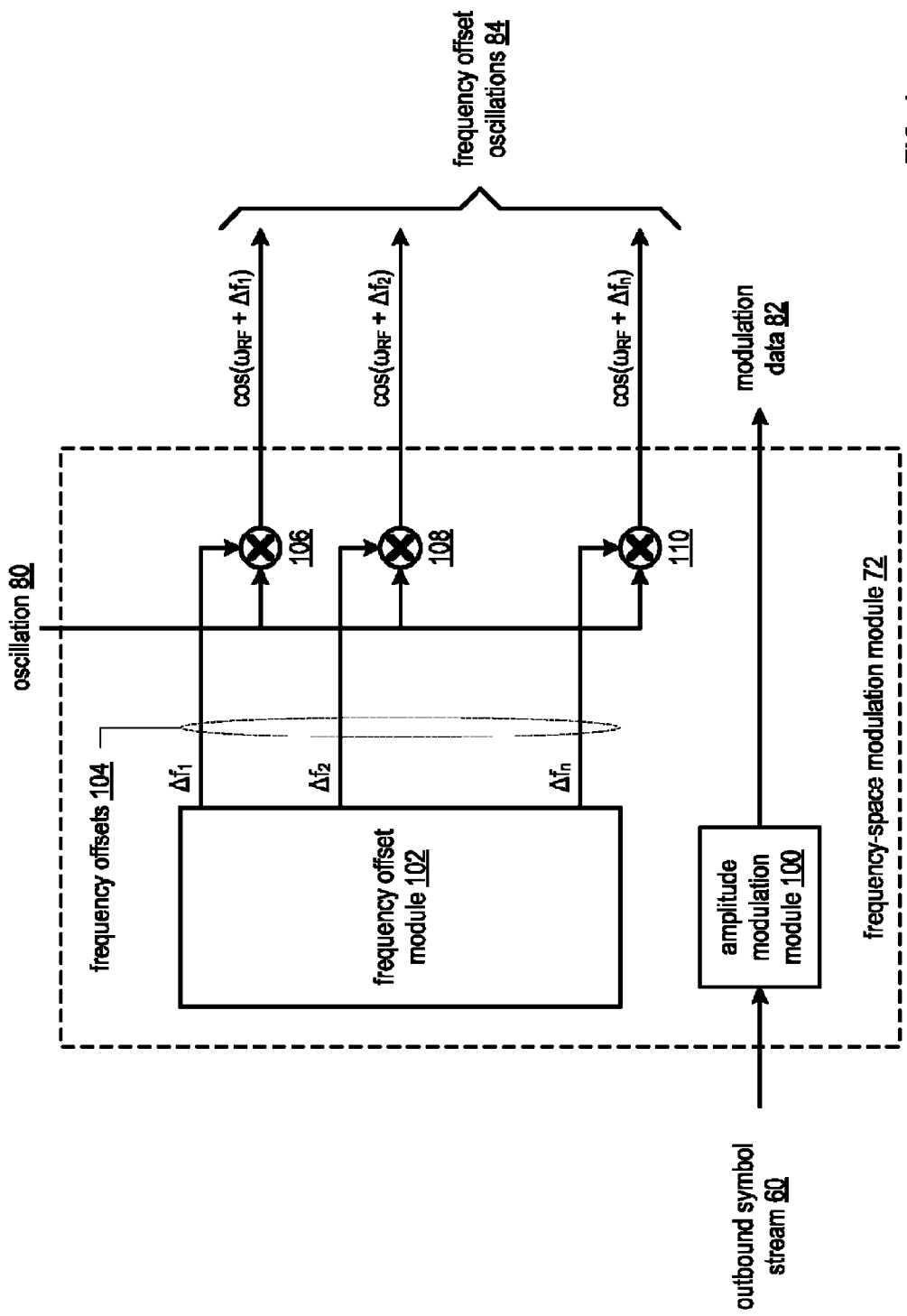
FIG. 4 is a schematic block diagram of an embodiment of a frequency-space modulation module in accordance with the present invention.

FIG. 4 is a schematic block diagram of an embodiment of a frequency-space modulation module 72 that includes an amplitude modulation module 100, a frequency offset module 102, and a plurality of mixing modules 106-110. The amplitude modulation module 100 generates amplitude modulation (AM) data or amplitude shift keying (ASK) data from the outbound symbol stream 60. Both concepts are known, thus no further discussion will be provided except to further explain an embodiment of the present invention.

The frequency offset module 104 generates the plurality of frequency offsets 104 (e.g., $\cos(\omega_{\Delta f1})$, $\cos(\omega_{\Delta f2})$, $\cos(\omega_{\Delta f3})$, etc.). The frequency offset module 104 may be a phase locked loop with multiple outputs, a digital frequency synthesizer with multiple outputs, a crystal oscillator with multiple frequency dividers and/or frequency multipliers, etc. The frequency offset module 104 provides the frequency offsets 104 to the mixing modules 106-110.

The mixing modules 106-110 mix the oscillation 80 (e.g., $\cos(\omega_{RF}(t))$) with the plurality of frequency offsets 104 (e.g., $\cos(\omega_{\Delta f1})$, $\cos(\omega_{\Delta f2})$, $\cos(\omega_{\Delta f3})$, etc.) to produce the frequency offset oscillations 84 (e.g., $\cos(\omega_{RF}+\Delta f_1)$, $\cos(\omega_{RF}+\Delta f_2)$, ..., $\cos(\omega_{RF}+\Delta f_n)$). Each mixing module 106-110 may include a mixer to mix the oscillation with a corresponding frequency offset 104 and may further include filtered to provide the desired frequency offset oscillations 84.

Figure 11:
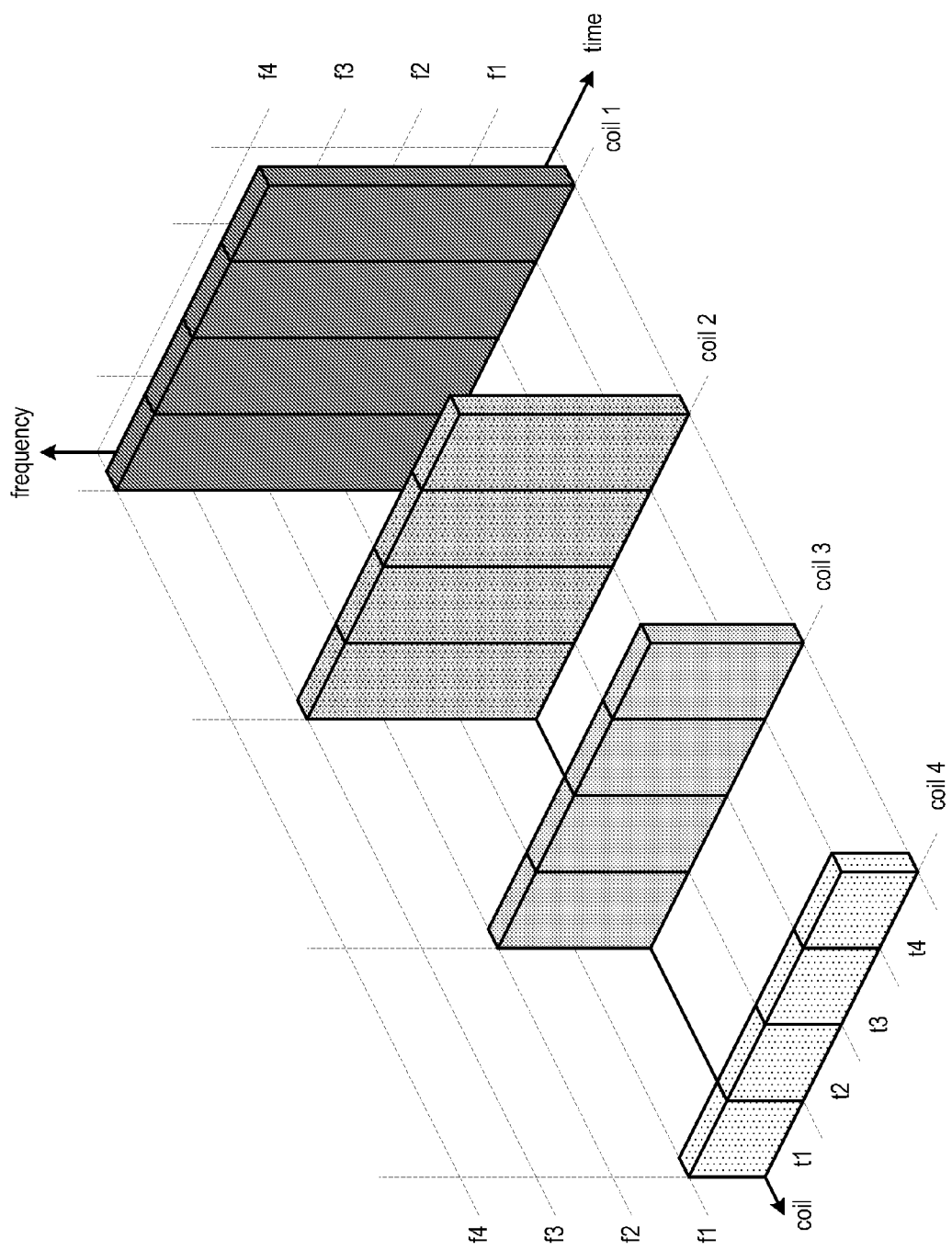
FIG. 11 is a diagram of another example of a frequency-space modulation scheme in accordance with the present invention.
Figure 12:
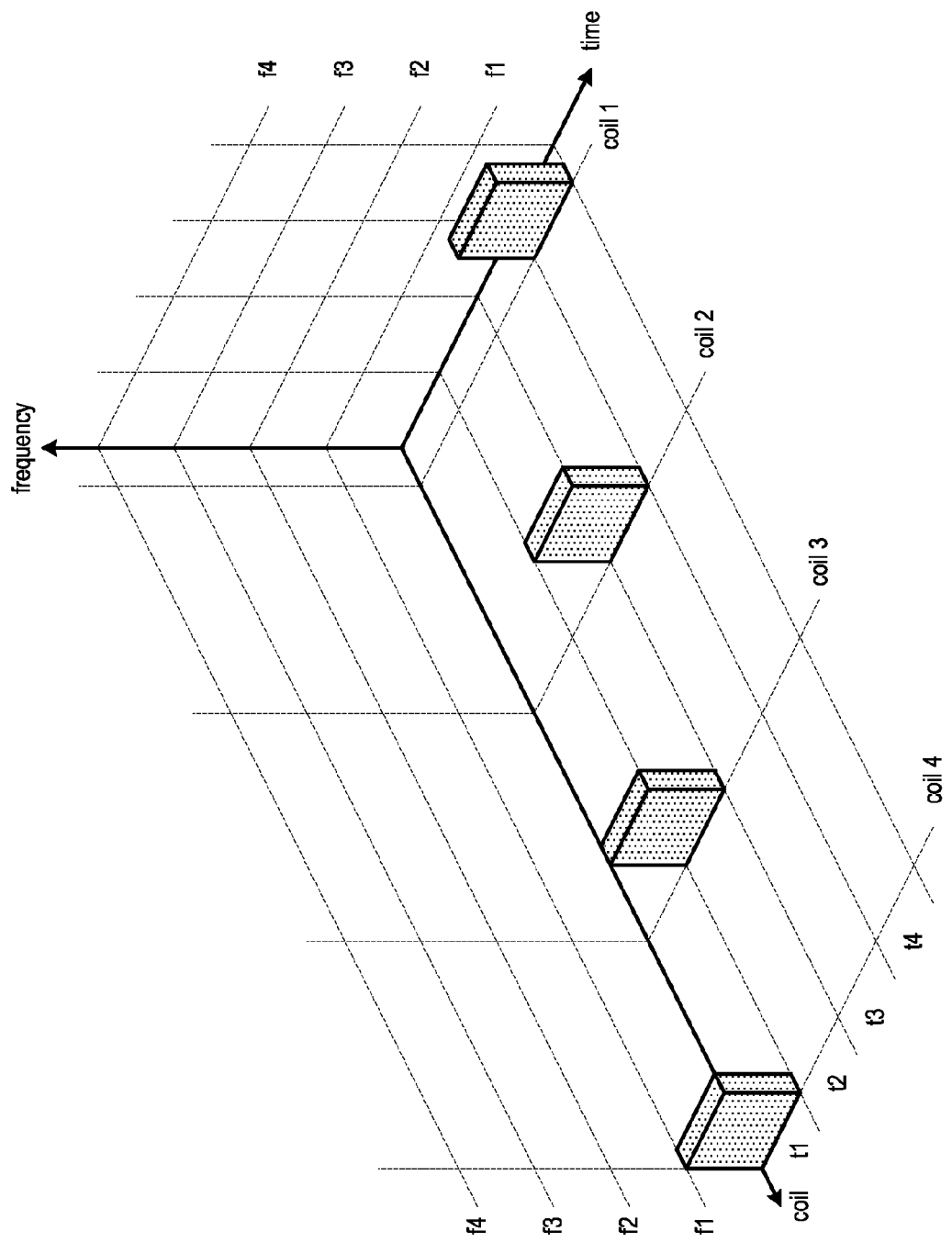
FIG. 12 is a diagram of another example of a frequency-space modulation scheme in accordance with the present invention.

In this embodiment, the frequency-space encoding scheme provides an outbound RFID signal 62 with a frequency offset 104 to a corresponding one of the coils. An example of this is shown in FIG. 11. The example of FIG. 11 includes four coils (1-4) and four signals with different frequency offsets (e.g., f1-f4). The figure further illustrates a repeating time frame of a plurality of time intervals (e.g., t1-t4). At time t1, the signal f1 is provided to coil 4, the signal f2 is provided to coil 3, the signal f4 s provided to coil 2, and the signal f4 is provided to coil 1. This pattern is mimicked at time intervals t2-t4.

Figure 5:
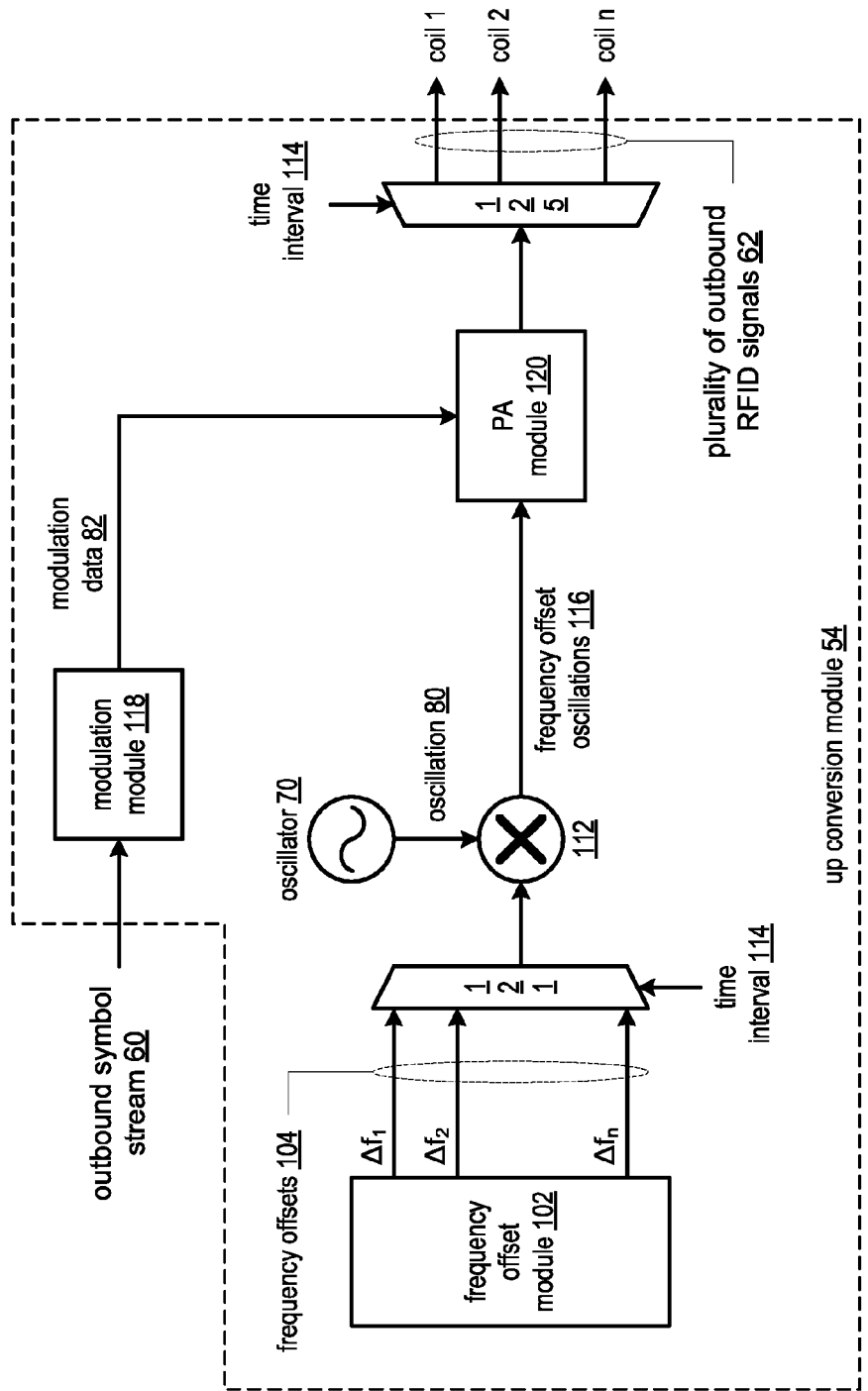
FIG. 5 is a schematic block diagram of another embodiment of an up conversion module in accordance with the present invention.

FIG. 5 is a schematic block diagram of another embodiment of an up conversion module 54 that includes the frequency offset module 102, a first multiplexer, a mixer 112, the oscillator 70, a modulation module 118, a power amplifier module 120, and a switch module 125. The oscillator 70 generates the oscillation 80 and provides it to the mixer 112; the modulation module 118 generates modulation data from the outbound symbol stream; and the frequency offset module 102 generates the plurality of frequency offsets 104 as previously discussed.

In this embodiment, the frequency-space encoding scheme provides one or more of the outbound RFID signals 62 to one or more of the coils in a time division multiplexing manner. An example of this scheme is provided in FIG. 12. This example includes the four coils (coil 1-4) and the time intervals (t1-t4), but only uses one outbound signal with a particular frequency offset (e.g., signal f1). As shown, from time interval to time interval, the signal (f1) is provided to a different coil. Note that this pattern repeats every four time intervals and may be repeated using the same outbound RF signal (e.g., f1) or it may use a different outbound RF signal (e.g., signal f2, f3, or f4). Further note that from time frame to time frame, a different outbound RF signal may be used (e.g., f1 for the $1^{st}$ frame, f2 for the $2^{nd}$ frame, etc, with the pattern repeating every four frames).

Figure 13:
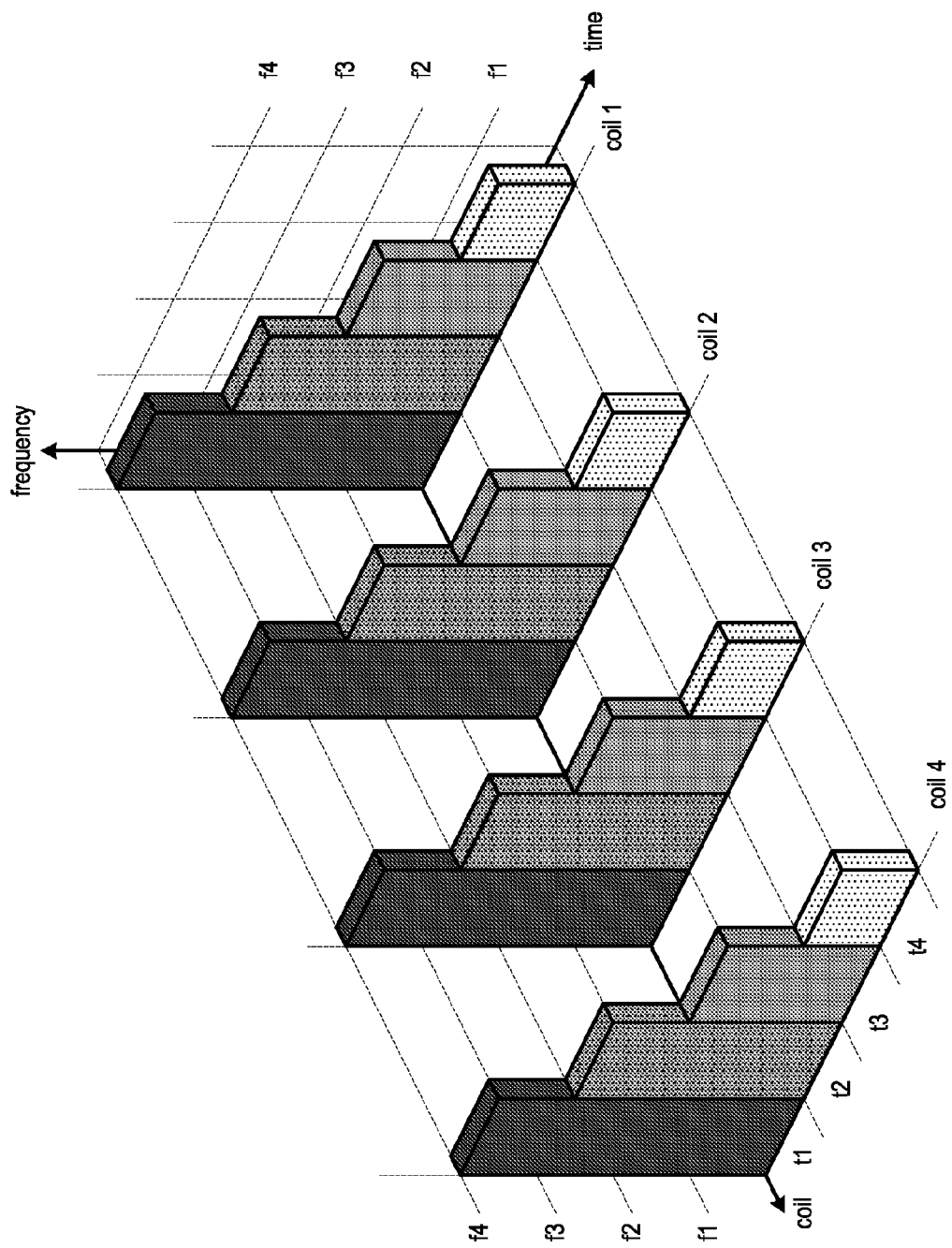
FIG. 13 is a diagram of another example of a frequency-space modulation scheme in accordance with the present invention.

FIG. 13 illustrates another example of frequency-space encoding. As shown, during a given time intervals (e.g., t1-t4) a given outbound RF signal (e.g., signal f1-f4) is provided to each of the four coils. For instance, during time interval t1, the fourth outbound RF signal (e.g., f4) is provided to each of the coils. At time t2, the third outbound RF signal (e.g., f3) is provided to the coils. At time t3, the second outbound RF signal (e.g., f2) is provided to the coils. At time t4, the first outbound RF signal (e.g., f1) is provided to the coils. At time interval t5, this pattern repeats.

Returning to the discussion of FIG. 5, during a first time interval 114 of a time frame, the mixing module 112 mixes the oscillation 80 with a first frequency offset (e.g., Δf1) to produce a first frequency offset oscillation 116. During this time interval, the multiplexer 121 provides the first frequency offset to the mixer. During a second time interval of the time frame, the mixing module 112 mixes the oscillation with a second frequency offset (e.g., Δf2) to produce a second frequency offset oscillation 116. This process continues for each time interval of a frame and then repeats for the next frame. Note that the mixing module 112 may include a mixer and may further include filtering and/or gain adjusting circuitry.

The power amplifier module 120, which may include one or more power amplifiers coupled in series and/or in parallel and/or one or more power amplifier drivers coupled in series and/or parallel, amplifies, during the first time interval, the first frequency offset oscillation 116 based on the modulation data 82 to produce a first outbound RFID signal 62. The switch module 125, which may include a multiplexer, demultiplexer, and/or switching network) provides the first outbound RFID signal to one or more of the plurality of coils 58 in accordance with the frequency-space encoding scheme (e.g., the example of FIGS. 12 and/or 13).

During the second time interval, the power amplifier module 120 amplifies the second frequency offset oscillation based on the modulation data 82 to produce a second outbound RFID signal 116. The switch module 125 provides the second outbound RFID signal to one or more of the plurality of coils 58 in accordance with the frequency-space encoding scheme. This process continues for each time interval of a frame and then repeats for the next frame.

Figure 6:
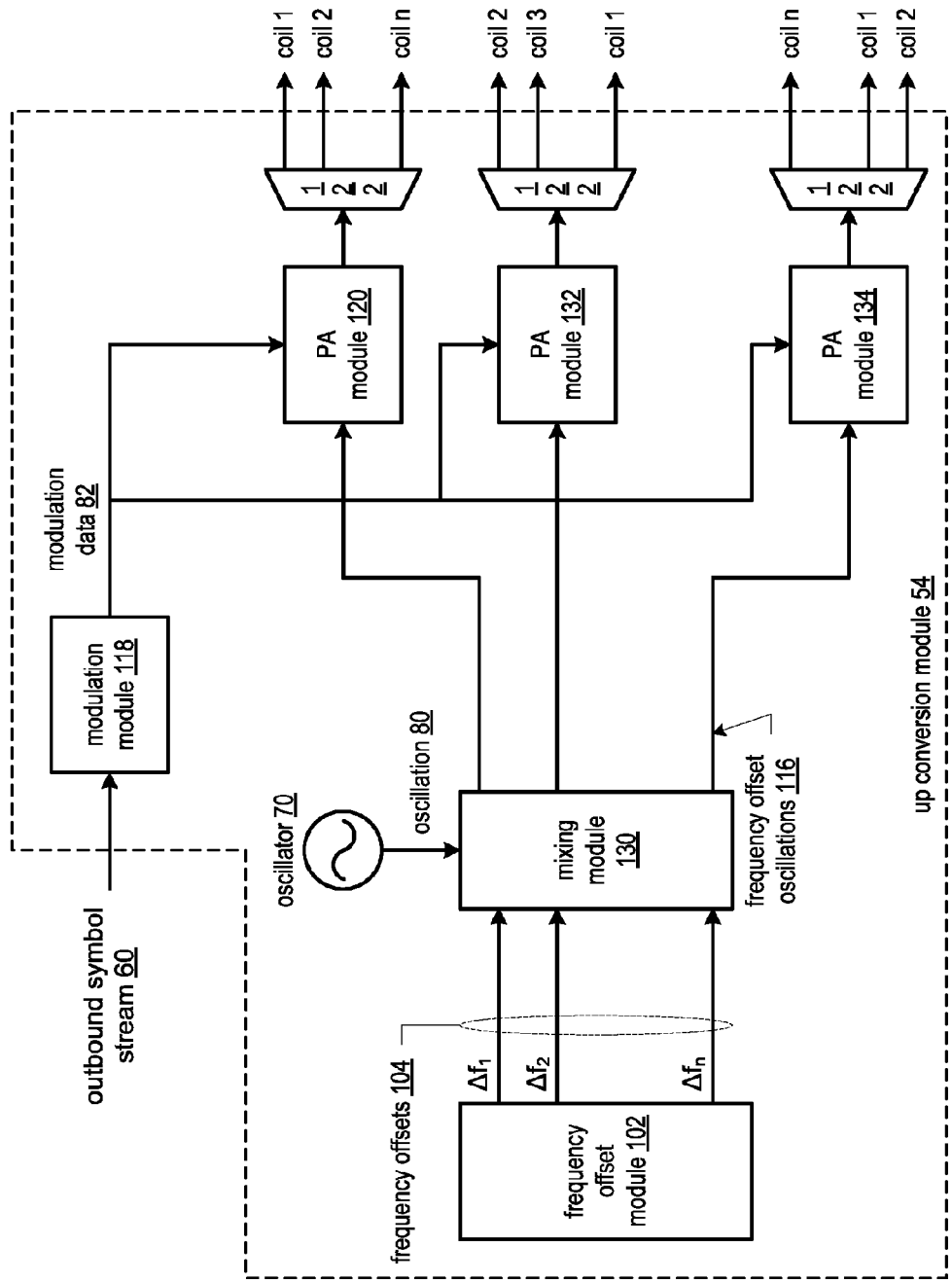
FIG. 6 is a schematic block diagram of another embodiment of an up conversion module in accordance with the present invention.

FIG. 6 is a schematic block diagram of another embodiment of an up conversion module 54 that includes the frequency offset module 120, a mixing module 130, the oscillator 70, the modulation module 118, a plurality of power amplifier modules 120, 132, 134, and a plurality of multiplexers 122. In this embodiment, the frequency-space encoding scheme provides the outbound RFID signals 62 to the coils 58 in a time and frequency division multiplexing manner. An example of this scheme is provided in FIG. 10. This example includes the four coils (coil 1-4), the time intervals (t1-t4), and the four outbound signals with a particular frequency offset (e.g., signals f1, f2, f3, and f4). As shown for the first time interval (t1), the first outbound signal (f1) is provided to the fourth coil, the second outbound signal (f2) is provided to the third coil, the third outbound signal (f3) is provided to the second coil, and the fourth outbound signal (f4) is provided to the first coil.

During the second time interval (t2), the first outbound signal (f1) is provided to the third coil, the second outbound signal (f2) is provided to the second coil, the third outbound signal (f3) is provided to the first coil, and the fourth outbound signal (f4) is provided to the fourth coil. During the third time interval (t3), the first outbound signal (f1) is provided to the second coil, the second outbound signal (f2) is provided to the first coil, the third outbound signal (f3) is provided to the fourth coil, and the fourth outbound signal (f4) is provided to the third coil. During the fourth time interval (t4), the first outbound signal (f1) is provided to the first coil, the second outbound signal (f2) is provided to the fourth coil, the third outbound signal (f3) is provided to the third coil, and the fourth outbound signal (f4) is provided to the second coil. At time interval t5, the time-frequency-space (e.g., coils 1-4 physically separated within the RFID reader or other device) repeats.

Returning to the discussion of FIG. 6, the oscillator 70 generates the oscillation 80 and provides it to the mixer 112; the modulation module 118 generates modulation data from the outbound symbol stream; and the frequency offset module 102 generates the plurality of frequency offsets 104 as previously discussed. The mixing module 130, which may include a plurality of mixing modules 112 of FIG. 5, mixes the oscillation 80 with the plurality of frequency offsets 104 to produce a plurality of frequency offset oscillations 116.

The plurality of power amplifier modules 120, 132, and 134 amplifies the plurality of frequency offset oscillations 116 in accordance with the modulation data 82 to produce a plurality of modulated and frequency offset oscillations. The multiplexer module, which includes a multiplexer, a plurality of multiplexers, and/or switching network, provides the plurality of modulated and frequency offset oscillations in a first pattern to the plurality of coils 58 as the plurality of outbound RFID signals 62 during a first time interval of a time frame. During a second time interval of the time frame, the multiplexer module 122 provides the plurality of modulated and frequency offset oscillations in a second pattern to the plurality of coils 58 as the plurality of outbound RFID signals 62. This process continues for each time interval of a frame and then repeats for the next frame.

Figure 7:
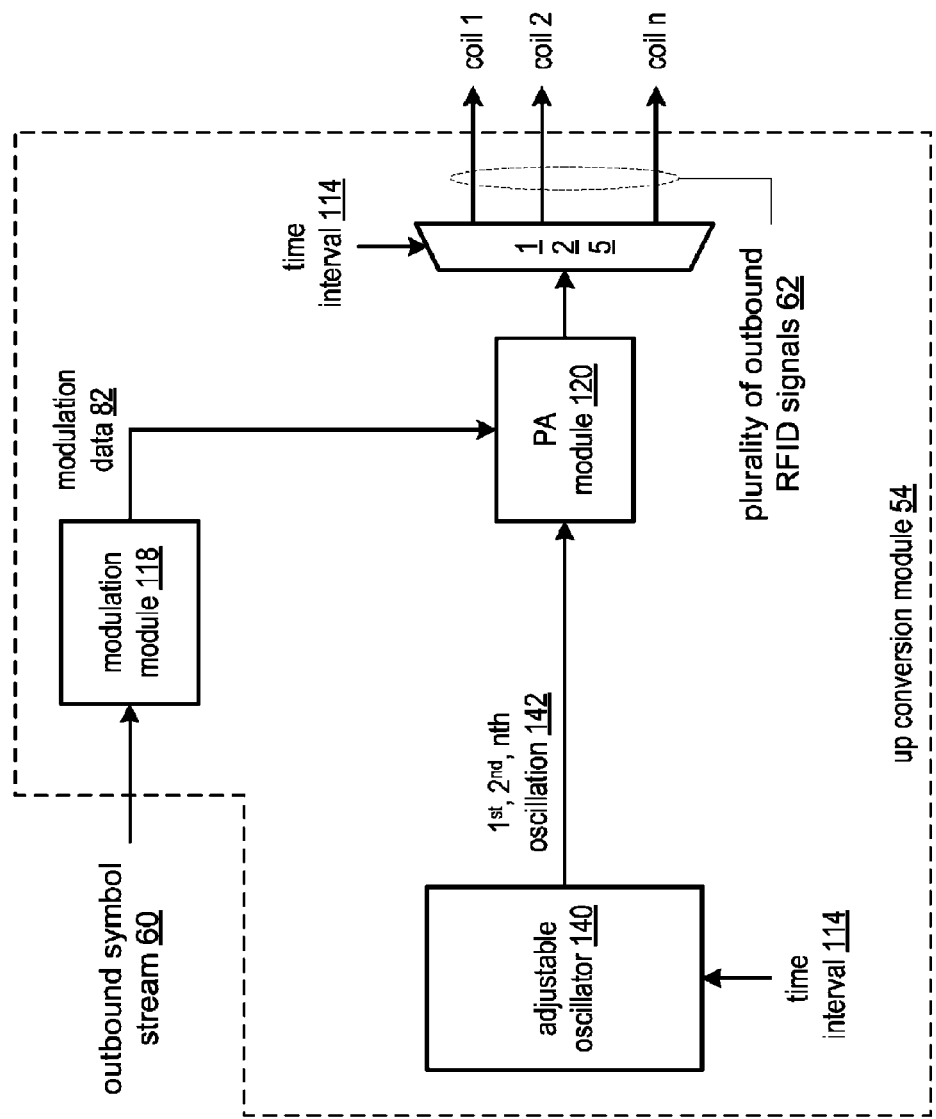
FIG. 7 is a schematic block diagram of another embodiment of an up conversion module in accordance with the present invention.

FIG. 7 is a schematic block diagram of another embodiment of an up conversion module 54 that includes an adjustable oscillator 140, the modulation module 118, the power amplifier module 120, and the switch module 125. The modulation module 118 functions as previously discussed. The adjustable oscillator 140 generates a plurality of oscillations 142 having different frequencies (e.g., RF, RF+Δf1, RF+Δf2, ... RF+Δfn) in a time sequential order. The adjustable oscillator 140 may be implemented using a fractional N synthesizer, a phase locked loop with an adjustable feedback, an adjustable counter based clock circuit, a digital frequency synthesizer, a plurality of such clock circuits with a multiplexer, etc.

In operation, the adjustable oscillator 140 generates, during a first time interval of a time frame, a first oscillation have a frequency at a desired RF carrier frequency (e.g., frequency RF). The power amplifier module 120 amplifies the first oscillation 142 based on the modulation data 82 (e.g., AM or ASK) to produce a first outbound RFID signal 62. The switch module 125 provides the first outbound RFID signal to one or more of the coils in accordance with the frequency-space encoding scheme (e.g., one of the examples of FIGS. 12 and/13).

During a second time interval of the time frame, the adjustable oscillator 140 generates a second oscillation have a frequency at a second desired RF carrier frequency (e.g., frequency RF+Δf1). The power amplifier module 120 amplifies the second oscillation 142 based on the modulation data 82 (e.g., AM or ASK) to produce a second outbound RFID signal 62. The switch module 125 provides the second outbound RFID signal to one or more of the coils in accordance with the frequency-space encoding scheme (e.g., one of the examples of FIGS. 12 and/13). This process continues for each time interval of a frame and then repeats for the next frame.

Figure 8:
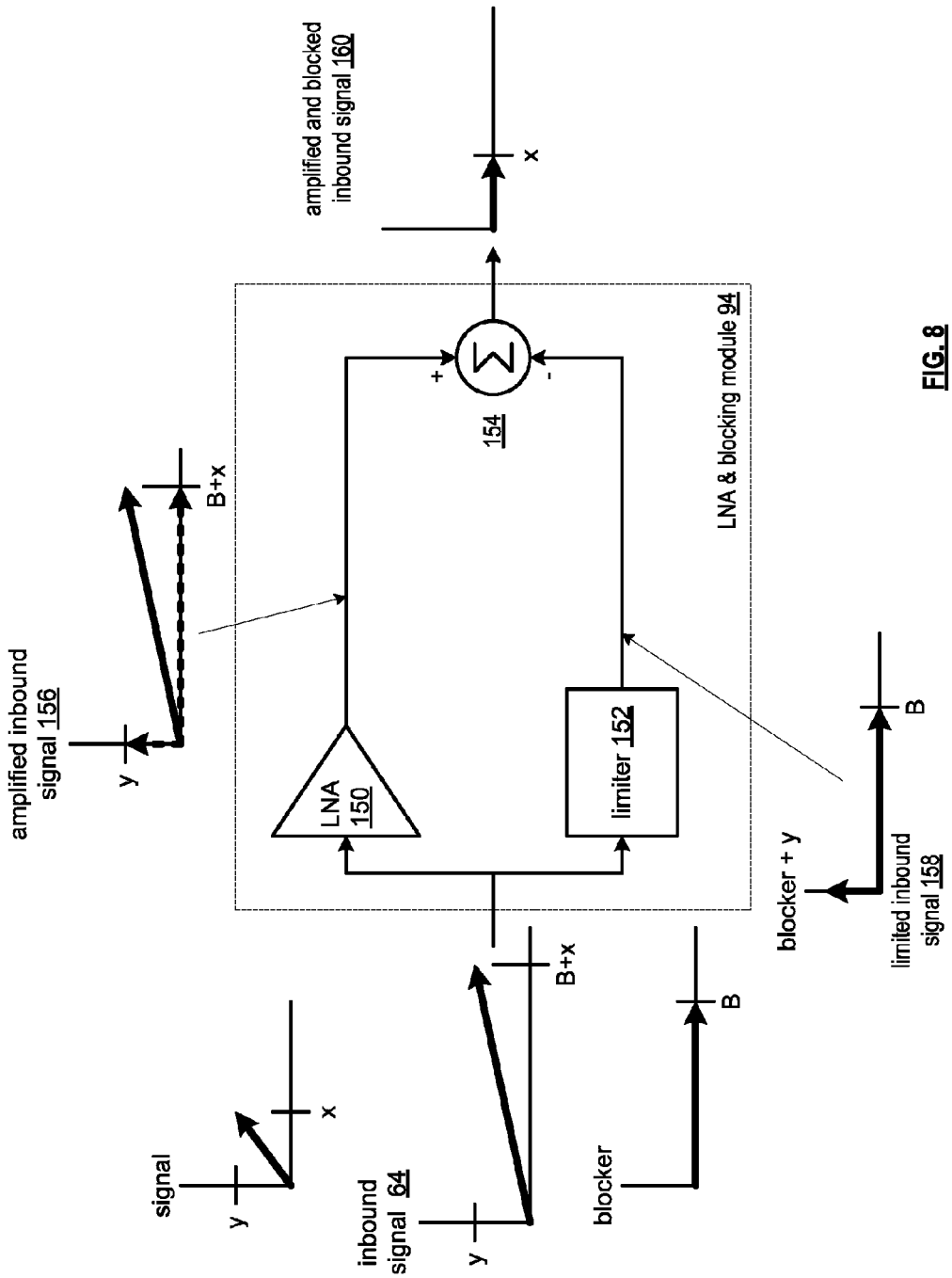
FIG. 8 is a schematic block diagram of an embodiment of an LNA and blocking module in accordance with the present invention.

FIG. 8 is a schematic block diagram of an embodiment of an LNA and blocking module 94 that includes a low noise amplifier (LNA) 150, a limiter 152, and a subtraction module 154. The LNA 150 amplifies the inbound RFID signal to produce an amplified inbound signal 156. FIG. 8 further includes graphical representations of the inbound RF signal 64 and the amplified inbound signal 156. Each signal 64 and 156 includes the combination of a desired component (e.g., the signal having a y-component and an x-component) and a blocking component (e.g., the blocker having a B component). In this instance, the blocking component corresponds to at least one of the plurality of outbound RFID signals being received by the LNA and blocking module 94.

The limiting module 152 limits the inbound RFID signal to produce a limited inbound RFID signal 158 that includes a substantially attenuated desired component and a substantially unattenuated block component. A graphical representation of signal 158 includes the y-component of the signal and the blocker signal (B). In an embodiment, the limiting module 152 a limiter that limits the inbound RF signal 158, which is amplitude modulated, to a constant envelope signal. The limiting module 152 may further include a scaling module such that the B component of the limited inbound signal 158 has a substantially similar magnitude of the received blocker component.

The subtraction module 154 subtracts the limited inbound RFID signal 158 from the inbound RFID signal 156 to produce an amplified and blocked inbound RFID signal 160. As graphically shown, the amplified and block signal 160 includes the x-component of the signal with the y-term and blocker component removed via the subtraction.

Figure 9:
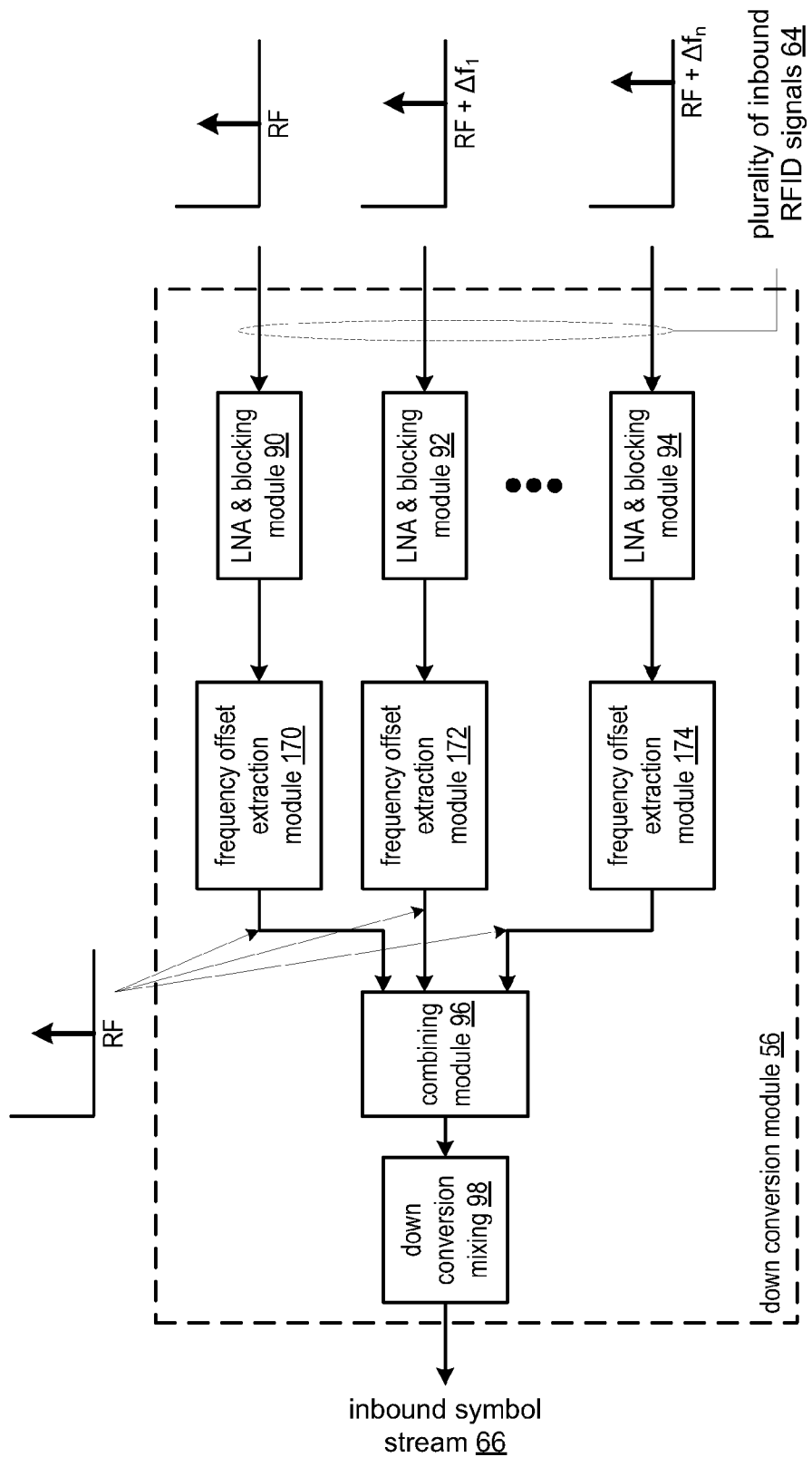
FIG. 9 is a schematic block diagram of another embodiment of a down conversion module in accordance with the present invention.
Figure 10:
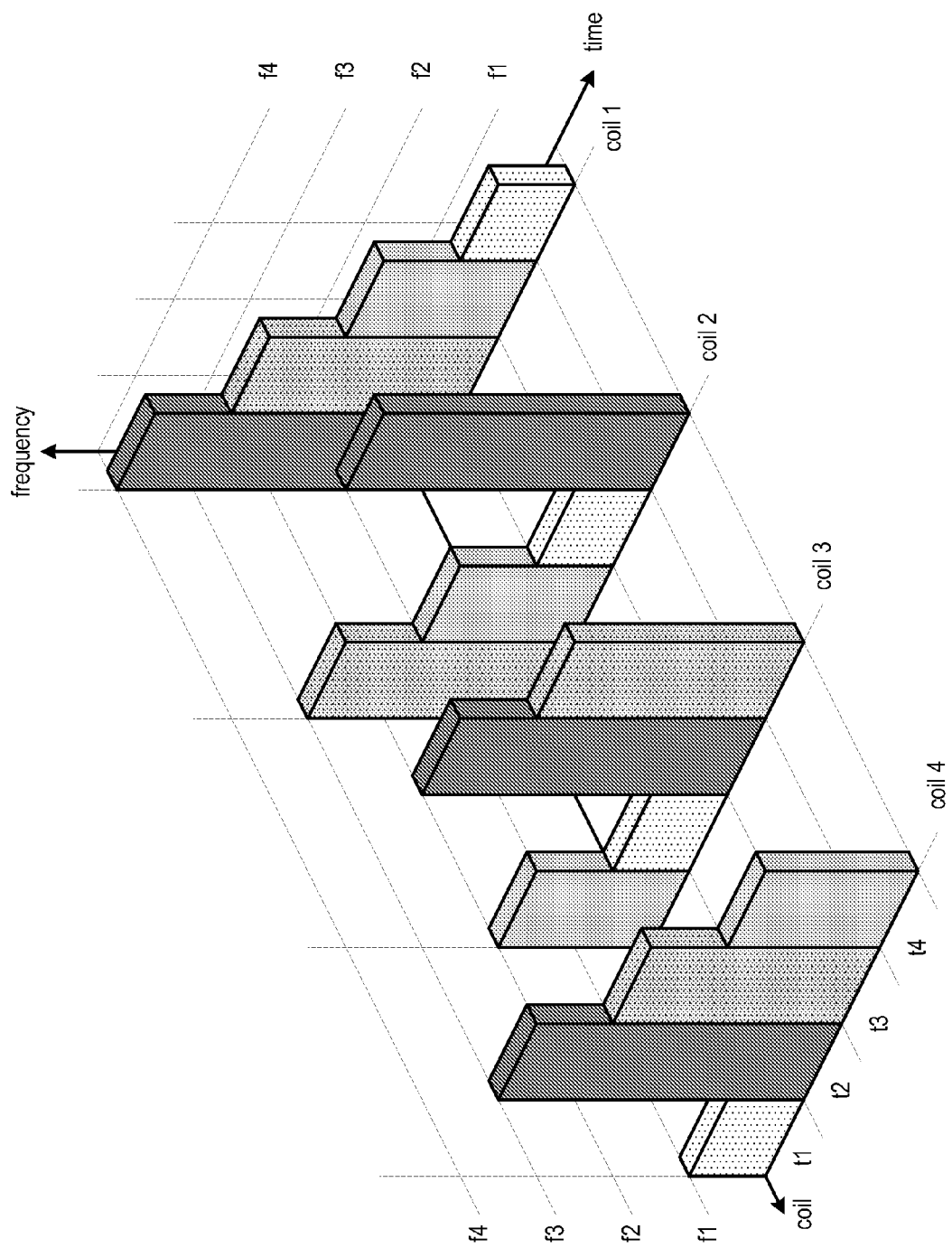
FIG. 10 is a diagram of an example of a frequency-space modulation scheme in accordance with the present invention.

FIG. 9 is a schematic block diagram of another embodiment of a down conversion module 56 that includes a plurality of LNA and blocking modules 90-94, a plurality of frequency offset extraction modules 170-174, a combining module 96, and a down conversion mixing module 98. The LNA and blocking modules 90-94, the combining module 96, and the down conversion mixing module 98 function as previously described.

As shown, each of the inbound RF signals 64 have a different frequency (e.g., RF, RF+Δf1, . . . , RF+Δfn). Correspondingly, the amplified inbound signals outputted by the LNA and blocking modules 90-94 also include the different frequencies. The frequency offset extraction modules, which may be a single module, removes the frequency offset from the amplified and blocked inbound RFID signals such that each signal provided to the combining module 96 has substantially the same frequency (e.g., RF).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A near field radio frequency identification (RFID) reader comprises:
   a baseband module coupled to convert outbound data into an outbound symbol stream and to convert an inbound symbol stream into inbound data;
   an up conversion module coupled to convert the outbound symbol stream into a plurality of outbound RFID signals based on a frequency-space encoding scheme;
   a plurality of coils coupled to electromagnetically transmit the plurality of outbound RFID signals based on the frequency-space encoding scheme and to electromagnetically receive a plurality of inbound RFID signals in accordance with the frequency-space encoding scheme; and
   a down conversion module coupled to convert the plurality of inbound RFID signals into the inbound symbol stream in accordance with the frequency-space encoding scheme.

2. The near field RFID reader of claim 1, wherein the up conversion module comprises:
   an oscillator coupled to generate an oscillation having a rate corresponding to a desired carrier frequency for the plurality of outbound RFID signals;
   a frequency-space modulation module coupled to generate modulation data from the outbound symbol stream and coupled to generate a plurality of frequency offset oscillations from the oscillation in accordance with the frequency-space encoding scheme; and
   a plurality of power amplifier modules coupled to amplify the plurality of frequency offset oscillations based on the modulation data to produce the plurality of outbound signals.

3. The near field RFID reader of claim 2, wherein the frequency-space modulation module comprises:
   an amplitude modulation module coupled to generate at least one of: amplitude modulation data and amplitude shift keying (ASK) data;
   a frequency offset module coupled to generate the plurality of frequency offsets; and
   a plurality of mixing modules coupled to mix the oscillation with the plurality of frequency offsets to produce a plurality of frequency offset oscillations, wherein the plurality of power amplifier modules amplifies the plurality of frequency offset oscillations based on the at least one of the amplitude modulation data and the ASK data to produce the plurality of outbound RFID signals.

4. The near field RFID reader of claim 1, wherein the up conversion module comprises:
   an oscillator coupled to generate an oscillation having a rate corresponding to a desired carrier frequency for the plurality of outbound RFID signals;
   a frequency offset module coupled to generate a plurality of frequency offsets;
   a mixing module coupled to:
      during a first time interval of a time frame, mix the oscillation with a first frequency offset of the plurality of frequency offsets to produce a first frequency offset oscillation;
      during a second time interval of the time frame, mix the oscillation with a second frequency offset of the plurality of frequency offsets to produce a second frequency offset oscillation;
   a modulation module coupled to generate modulation data from the outbound symbol stream;
   a power amplifier module coupled to:
      during the first time interval, amplify the first frequency offset oscillation based on the modulation data to produce a first outbound RFID signal of the plurality of outbound RFID signals;
      during the second time interval, amplify the second frequency offset oscillation based on the modulation data to produce a second outbound RFID signal of the plurality of outbound RFID signals; and
   a switch module coupled to:
      during the first time interval, provide the first outbound RFID signal to at least a first coil of the plurality of coils; and
      during the second time interval, provide the second outbound RFID signal to at least a second coil of the plurality of coils.

5. The near field RFID reader of claim 1, wherein the up conversion module comprises:
   an oscillator coupled to generate an oscillation having a rate corresponding to a desired carrier frequency for the plurality of outbound RFID signals;
   a frequency offset module coupled to generate a plurality of frequency offsets;
   a mixing module coupled to mix the oscillation with the plurality of frequency offsets to produce a plurality of frequency offset oscillations;
   a modulation module coupled to generate modulation data from the outbound symbol stream;
   a plurality of power amplifier modules coupled to amplify the plurality of frequency offset oscillations in accordance with the modulation data to produce a plurality of modulated and frequency offset oscillations; and
   a multiplexer module coupled to:
      during a first time interval of a time frame, provide the plurality of modulated and frequency offset oscillations in a first pattern to the plurality of coils as the plurality of outbound RFID signals; and
      during a second time interval of the time frame, provide the plurality of modulated and frequency offset oscillations in a second pattern to the plurality of coils as the plurality of outbound RFID signals.

6. The near field RFID reader of claim 1, wherein the up conversion module comprises:
   an adjustable oscillator coupled to:
      during a first time interval of a time frame, generate the oscillation having a rate corresponding to a desired carrier frequency for the plurality of outbound RFID signals;
      during a second time interval of the time frame, generating a second oscillation having a rate corresponding to the rate of the oscillation plus or minus a frequency offset;
   a modulation module coupled to generate modulation data from the outbound symbol stream;
   a power amplifier module coupled to:
      during the first time interval, amplify the oscillation based on the modulation data to produce a first outbound RFID signal of the plurality of outbound RFID signals;
      during the second time interval, amplify the second oscillation based on the modulation data to produce a second outbound RFID signal of the plurality of outbound RFID signals; and a switch module coupled to:
 during the first time interval, provide the first outbound RFID signal to at least a first coil of the plurality of coils; and
 during the second time interval, provide the second outbound RFID signal to at least a second coil of the plurality of coils.

7. The near field RFID reader of claim 1, wherein the down conversion module comprises:
 a plurality of low noise amplifier blocking modules coupled to amplify the plurality of inbound RFID signals and to block, therefrom, the plurality of outbound RFID signals to produce a plurality of amplified and blocked inbound RFID signals;
 a combining module coupled to combine the plurality of amplified and blocked inbound RFID signals to produce a combined inbound RFID signal; and
 a down conversion mixing module coupled to mix the combined inbound RFID signal with an oscillation to produce inbound symbol stream.

8. The near field RFID reader of claim 7, wherein a low noise amplifier blocking module of the plurality of low noise amplifier blocking modules comprises:
 a low noise amplifier coupled to amplify an inbound RFID signal of the plurality of inbound RFID signals to produce an amplified inbound RFID signal, wherein the inbound RFID signal includes a desired component and a blocking component, and wherein the blocking component corresponds to at least one of the plurality of outbound RFID signals;
 a limiting module coupled to limit the inbound RFID signal to produce a limited inbound RFID signal that includes a substantially attenuated desired component and a substantially unattenuated block component; and
 a subtraction module coupled to subtract the limited inbound RFID signal from the inbound RFID signal to produce one of the plurality of amplified and blocked inbound RFID signals.

9. The near field RFID reader of claim 8, wherein the low noise amplifier blocking further comprises:
 a frequency offset extraction module coupled to remove a frequency offset from the one of the plurality of amplified and blocked inbound RFID signals.

10. The near field RFID reader of claim 7, wherein the combining module comprises:
 a plurality of frequency offset extraction modules coupled to remove frequency offsets from the plurality of inbound RFID signals to produce a plurality of frequency aligned inbound RFID signals; and
 a summing module coupled to sum the plurality of frequency aligned inbound RFID signals to produce the combined inbound RFID signal.

11. The near field RFID reader of claim 7, wherein the down conversion module further comprises:
 a multiplexer coupled to provide selected ones of the plurality of inbound RFID signals to the plurality of low noise amplifier blocking modules.

12. A near field communication front-end comprises:
 an up conversion module coupled to convert an outbound symbol stream into a plurality of outbound signals based on a frequency-space encoding scheme;
 a plurality of coils coupled to electromagnetically transmit the plurality of outbound signals and to electromagnetically receive a plurality of inbound signals in accordance with the frequency-space encoding scheme; and
 a down conversion module coupled to convert the plurality of inbound signals into an inbound symbol stream in accordance with the frequency-space encoding scheme.

13. The near field communication front-end of claim 12, wherein the up conversion module comprises:
 an oscillator coupled to generate an oscillation having a rate corresponding to a desired carrier frequency for the plurality of outbound signals;
 a frequency-space modulation module coupled to generate modulation data from the outbound symbol stream and coupled to generate a plurality of frequency offset oscillations from the oscillation in accordance with the frequency-space encoding scheme; and
 a plurality of power amplifier modules coupled to amplify the plurality of frequency offset oscillations based on the modulation data to produce the plurality of outbound signals.

14. The near field communication front-end of claim 13, wherein the frequency-space modulation module comprises:
 an amplitude modulation module coupled to generate at least one of: amplitude modulation data and amplitude shift keying (ASK) data;
 a frequency offset module coupled to generate the plurality of frequency offsets; and
 a plurality of mixing modules coupled to m1x the oscillation with the plurality of frequency offsets to produce a plurality of frequency offset oscillations, wherein the plurality of power amplifier modules amplifies the plurality of frequency offset oscillations based on the at least one of the amplitude modulation data and the ASK data to produce the plurality of outbound RFID signals.

15. The near field communication front-end of claim 12, wherein the up conversion module comprises:
 an oscillator coupled to generate an oscillation having a rate corresponding to a desired carrier frequency for the plurality of outbound signals;
 a frequency offset module coupled to generate a plurality of frequency offsets;
 a mixing module coupled to:
  during a first time interval of a time frame, m1x the oscillation with a first frequency offset of the plurality of frequency offsets to produce a first frequency offset oscillation;
  during a second time interval of the time frame, mix the oscillation with a second frequency offset of the plurality of frequency offsets to produce a second frequency offset oscillation;
 a modulation module coupled to generate modulation data from the outbound symbol stream;
 a power amplifier module coupled to:
  during the first time interval, amplify the first frequency offset oscillation based on the modulation data to produce a first outbound signal of the plurality of outbound signals;
  during the second time interval, amplify the second frequency offset oscillation based on the modulation data to produce a second outbound signal of the plurality of outbound signals; and
 a multiplexer module coupled to:
  during the first time interval, provide the first outbound signal to at least a first coil of the plurality of coils; and
  during the second time interval, provide the second outbound signal to at least a second coil of the plurality of coils.

16. The near field communication front-end of claim 12, wherein the up conversion module comprises:
- an oscillator coupled to generate an oscillation having a rate corresponding to a desired carrier frequency for the plurality of outbound signals;
- a frequency offset module coupled to generate a plurality of frequency offsets;
- a mixing module coupled to mix the oscillation with the plurality of frequency offsets to produce a plurality of frequency offset oscillations;
- a modulation module coupled to generate modulation data from the outbound symbol stream;
- a plurality of power amplifier modules coupled to amplify the plurality of frequency offset oscillations in accordance with the modulation data to produce a plurality of modulated and frequency offset oscillations; and
- a switch module coupled to:
  - during a first time interval of a time frame, provide the plurality of modulated and frequency offset oscillations in a first pattern to the plurality of coils as the plurality of outbound signals; and
  - during a second time interval of the time frame, provide the plurality of modulated and frequency offset oscillations in a second pattern to the plurality of coils as the plurality of outbound signals.

17. The near field communication front-end of claim 12, wherein the up conversion module comprises:
- an adjustable oscillator coupled to:
  - during a first time interval of a time frame, generate the oscillation having a rate corresponding to a desired carrier frequency for the plurality of outbound signals;
  - during a second time interval of the time frame, generating a second oscillation having a rate corresponding to the rate of the oscillation plus or minus a frequency offset;
- a modulation module coupled to generate modulation data from the outbound symbol stream;
- a power amplifier module coupled to:
  - during the first time interval, amplify the oscillation based on the modulation data to produce a first outbound signal of the plurality of outbound signals;
  - during the second time interval, amplify the second oscillation based on the modulation data to produce a second outbound signal of the plurality of outbound signals; and
- a switch module coupled to:
  - during the first time interval, provide the first outbound signal to at least a first coil of the plurality of coils; and
  - during the second time interval, provide the second outbound signal to at least a second coil of the plurality of coils.

18. The near field communication front-end of claim 12, wherein the down conversion module comprises:
- a plurality of low noise amplifier blocking modules coupled to amplify the plurality of inbound RFID signals and to block the plurality of output signals to produce a plurality of amplified and blocked inbound signals;
- a combining module coupled to combine the plurality of amplified and blocked inbound signals to produce a combined inbound signal; and
- a down conversion mixing module coupled to mix the combined inbound signal with an oscillation to produce inbound symbol stream.

19. The near field communication front-end of claim 18, wherein a low noise amplifier blocking module of the plurality of low noise amplifier blocking modules comprises:
- a low noise amplifier coupled to amplify an inbound signal of the plurality of inbound signals to produce an amplified inbound signal, wherein the inbound signal includes a desired component and a blocking component, and wherein the blocking component corresponds to at least one of the plurality of outbound signals;
- a limiting module coupled to limit the inbound signal to produce a limited inbound signal that includes a substantially attenuated desired component and a substantially unattenuated block component; and
- a subtraction module coupled to subtract the limited inbound signal from the inbound signal to produce one of the plurality of amplified and blocked inbound signals.

20. The near field communication front-end of claim 19, wherein the low noise amplifier blocking further comprises:
- a frequency offset extraction module coupled to remove a frequency offset from the one of the plurality of amplified and blocked inbound signals.

21. The near field communication front-end of claim 18, wherein the combining module comprises:
- a plurality of frequency offset extraction modules coupled to remove frequency offsets from the plurality of inbound signals to produce a plurality of frequency aligned inbound signals; and
- a summing module coupled to sum the plurality of frequency aligned inbound signals to produce the combined inbound signal.

22. The near field communication front-end of claim 18, wherein the down conversion module further comprises:
- a multiplexer coupled to provide selected ones of the plurality of inbound signals to the plurality of low noise amplifier blocking modules.

* * * * *

UNITED STATES PATENT AND TRADEMARK OFFICE
CERTIFICATE OF CORRECTION

PATENT NO. : 8,115,598 B2  
APPLICATION NO. : 12/048786  
DATED : February 14, 2012  
INVENTOR(S) : Ahmadreza Rofougaran et al.

Page 1 of 1

It is certified that error appears in the above-identified patent and that said Letters Patent is hereby corrected as shown below:

In the Claims:

Col. 14, line 26, in claim 14: replace "m1x the" with --mix the--
Col. 14, line 42, in claim 15: replace "m1x" with --mix the--
Col. 16, line 4, in claim 18: replace "amplifY the" with --amplify the--

Signed and Sealed this
Twenty-third Day of April, 2013

Teresa Stanek Rea
*Acting Director of the United States Patent and Trademark Office*